Patented Mar. 24, 1953

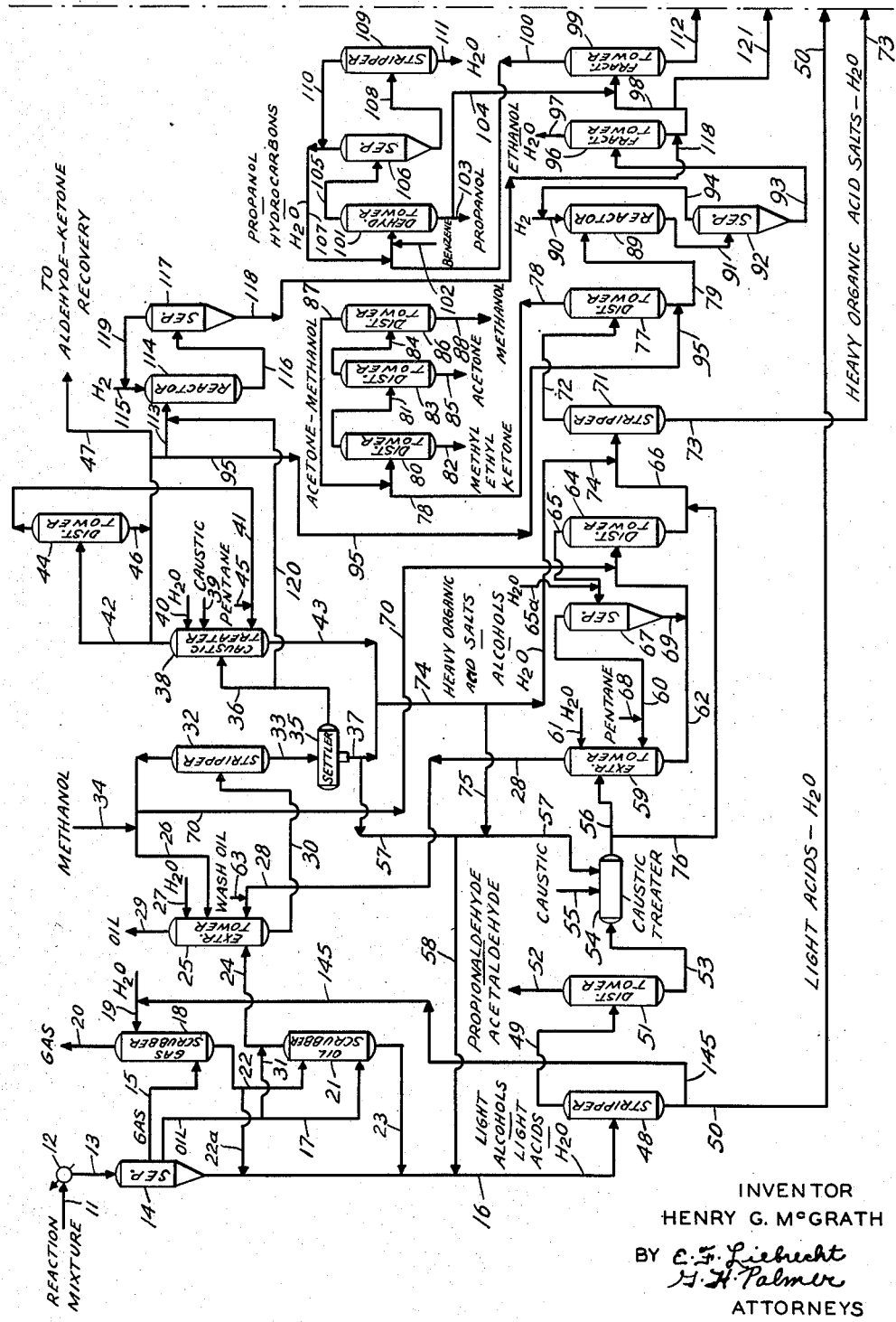

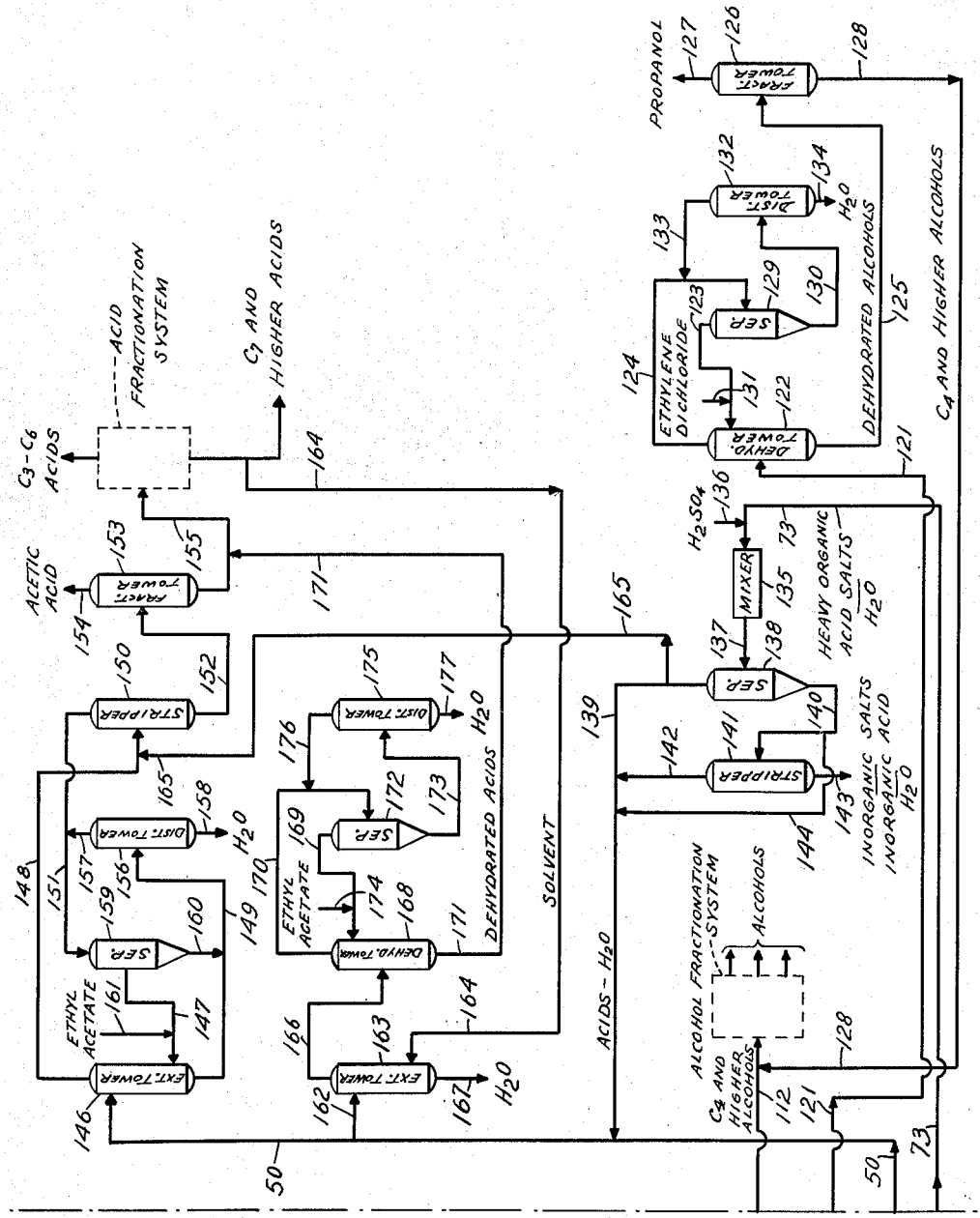

2,632,765

UNITED STATES PATENT OFFICE 2,632,765

SEPARATION OF ORGANIC COMPOUNDS

Henry G. McGrath, Elizabeth, N. J., assignor to The M. W. Kellogg Company, Jersey City, N. J., a corporation of Delaware Application February 27, 1947, Serial No. 731,269

8 Claims. (Cl. 260—450)

1

This invention relates to the separation of organic compounds and relates more particularly to the separation of oxygenated organic compounds from the reaction product obtained in the catalytic hydrogenation of oxides of carbon at elevated temperatures. Still more particularly, the invention relates to an improved process for the separation and recovery of useful oxygenated organic compounds present in the reactor gas obtained in the hydrogenation of oxides of carbon in the presence of a reducible metal catalyst. These compounds comprise, essentially, light and heavy alcohols and organic acids, esters, aldehydes, ketones and also hydrocarbons.

It is an object, and the process of this invention is directed, to provide for an improved method for the separation of oxygenated organic compounds present in the reactor gas obtained in the catalytic hydrogenation of oxides of carbon, in order to effect efficient and economical recovery of relatively high yields of such compounds. Other objects and advantages will be apparent from the following more detailed disclosure.

The accompanying drawing illustrates, diagrammatically, one form of the apparatus employed and capable of carrying out one embodiment of the process of the invention. The invention will be described in detail by reference to a process employing the apparatus illustrated in the drawing, but it should be noted that it is not intended that the invention be limited to the embodiment as illustrated but is capable of other embodiments which may extend beyond the scope of the apparatus illustrated in the drawing. Furthermore, the distribution and circulation of liquids and vapors is illustrated in the drawing by diagrammatic representation of the apparatus employed. Valves, pumps, compressors, coolers and other mechanical elements necessary to effect the transfer of liquids and vapors and to maintain the conditions of temperature and pressure necessary to carry out the function of the apparatus are omitted, in order to simplify the description. It will be understood, however, that much equipment of this nature is necessary and will be supplied by those skilled in the art.

Referring to the drawing, the product of the reaction of an oxide of carbon and hydrogen is supplied through line 11. This product is in vapor form substantially as it comes from the reactor at temperatures varying between approximately 300° F. to 700° F. and is first cooled to condense substantially large quantities of normally liquid components. Conveniently, condensation may be effected in a plurality of cooling stages which are represented diagrammatically in the drawing by cooler 12 with which

2 line 11 connects. From cooler 12 the mixture of condensate and uncondensed gas passes through line 13 to a separator 14. In the latter, the gases are withdrawn through line 15 and the condensate separates as a lower aqueous phase and an upper oil phase. Both phases, thus obtained, contain oxygenated organic compounds, those of lower molecular weight tending to remain in the aqueous phase, while those of higher molecular weight tend to remain in the oil phase. The aqueous phase is drawn off from the bottom of separator 14 through line 16, and the oil phase is drawn off at an intermediate point through line 17. It should be noted that apparatus embodying more than one separation stage may be employed if desired; for example, primary and secondary separation stages may be introduced operating successively and respectively at temperatures of about 150° F. and 100° F.

The gases separated in separator 14 are passed through line 15 to a low point in a suitable scrubbing vessel 18. In this gas scrubber, the gases are intimately contacted with water or with an aqueous solution containing oxygenated organic compounds introduced through line 19, in order to absorb the more volatile oxygenated compounds in the water. The remaining gas, essentially free of oxygenated compounds and consisting essentially of light hydrocarbons, is withdrawn overhead through line 20 for further treatment or use outside the scope of the present process.

The oil phase separated in separator 14, is transferred through line 17 to a low point in an oil scrubber 21, in which the oil is contacted intimately with water, to absorb in the water the oxygenated compounds which are dissolved in the oil and are relatively more soluble in water, such as low boiling alcohols, ketones, aldehydes, and acids. The water employed for this purpose conveniently may be the water employed for scrubbing in gas scrubber 18, which is transferred from scrubber 18 to the upper part of oil scrubber 21 through line 22. The scrubbing water, containing dissolved oxygenated compounds, is withdrawn from the bottom of oil scrubber 21 through line 23, which conveniently connects with line 16 for combining the scrubbing water with the water phase withdrawn from separator 14. It is also possible to transfer the water, withdrawn from scrubber 18 through line 22, directly into line 16, through line 22a, with which line 16 connects.

The scrubbed oil is withdrawn overhead from oil scrubber 21 through line 24. This oil, comprising essentially a mixture of organic acids, alcohols, esters, aldehydes, ketones and hydrocarbons is transferred through line 24 to a low point in an extraction tower 25. In tower 25, the oil introduced through line 24 is subjected to intimate countercurrent contact with a light alcohol as a treating agent, such as methanol or ethanol, which is introduced into tower 25 at an upper point through line 26. The treating agent and the oil introduced through line 24, are contacted in tower 25 under conditions effective to absorb in the treating agent substantially all of the oxygenated compounds contained in the oil and thus separate these oxygenated compounds from hydrocarbons present. As a result of such treatment, a lower aqueous alcohol layer and an upper hydrocarbon or oil layer are formed in tower 25. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the alcohol treating agent is substantially prevented. To obtain such dilution, water is introduced into tower 25 at an upper point above the alcohol inlet through line 27. The use of water in the manner described is effective not only for the purpose of alcohol dilution, but its introduction at an upper point in tower 25, accomplishes the result of washing the upper hydrocarbon or oil layer free of the added alcohol treating agent.

Aqueous methanol, used as a treating agent in the instant example is not, however, completely selective in effecting total extraction of oxygenated organic compounds from hydrocarbons present in tower 25. Hence, the liquid flowing down tower 25 will contain some hydrocarbons in solution in addition to oxygenated organic compounds. These hydrocarbons may comprise a mixture of proportionately small quantities of all the hydrocarbons present in the oil stream entering tower 25 through line 24 and would render subsequent separation of pure oxygenated compounds highly difficult. A light hydrocarbon stream, functioning as a wash-oil, is therefore introduced at a point near the bottom of tower 25 through line 28. This hydrocarbon stream effects the washing of the lower aqueous methanol layer in tower 25, free of hydrocarbons contained therein, in that these hydrocarbons are displaced by dilution, leaving the methanol layer saturated with the wash-oil. It is desirable that this wash-oil be of such composition that there are no components present in a substantial amount, that are heavier than the highest boiling hydrocarbon which forms an azeotrope with the alcohol treating agent. The boiling point of the wash-oil selected must, therefore, be substantially within or below the boiling range of the oxygenated compounds that are to be separated. Following the above-mentioned wash-oil treatment, there is present in tower 25 an upper hydrocarbon or oil layer containing substantially all the hydrocarbons that were present in the oil stream entering tower 25 through line 24 and substantially large quantities of the wash-oil, and there is also present a lower aqueous methanol layer saturated with wash-oil and containing extracted oxygenated compounds. The upper hydrocarbon or oil layer is withdrawn overhead as a raffinate from tower 25 through line 29 and is in condition for further use or treatment outside the scope of the present process. The lower aqueous methanol layer from tower 25 is withdrawn as an extract through line 30. It should be noted that it is also possible to transfer the aforementioned oil phase from separator 14 directly into tower 25 through line 31, by-passing tower 21, for treatment in the process described above. Where such procedure is employed, low boiling alcohols, ketones and aldehydes are subjected to treatment in tower 25 together with higher boiling components present in the oil phase obtained from separator 14 and withdrawn through line 17.

The lower aqueous methanol layer from tower 25, saturated with wash-oil and containing oxygenated compounds, is transferred through line 30 to a fractionation tower 32. Tower 32, functioning as a methanol stripper, is operated under conditions effective to separate the aqueous methanol layer, introduced from tower 25 through line 30, into an overhead alcohol fraction comprising essentially methanol and hydrocarbons which is withdrawn through line 26, and a lower fraction normally consisting of two phases, one phase comprising substantially oxygenated compounds and the other phase comprising substantially water, containing some dissolved oxygenated compounds. These combined phases are withdrawn as bottoms through line 33. The overhead alcohol fraction from tower 32 is withdrawn through line 26 as a vapor, and is cooled to liquefy methanol and hydrocarbon components. The mixture of methanol and hydrocarbons thus liquefied, is transferred through line 26 into tower 25 for repeated use as the methanol treating agent in the process hereinbefore described. Make-up methanol is introduced through line 26 through line 34 with which line 26 connects. Bottoms from tower 32, comprising essentially an aqueous mixture of dissolved oxygenated compounds, namely, heavy alcohols, aldehydes, ketones, and lesser amounts of organic acids and esters, are transferred through line 33 to a settler 35. In settler 35, separation is effected between the aforementioned oxygenated compounds which are withdrawn through line 36 as an upper oil layer, and a lower water layer which is withdrawn through line 37 for further use in the process hereinafter described.

The above-mentioned oxygenated compounds, withdrawn as an upper oil layer from settler 35 are transferred through line 36 to a caustic treater 38. In treater 38, the oil layer introduced through line 36 is treated with alkali to neutralize any traces of organic acids present that were not removed by the alcohol treating agent in tower 25, and such alkali may also be introduced in increased quantities under suitable conditions of temperature effective to saponify esters or polymerize aldehydes. Alkali thus employed, converts organic acids contained in the oil layer to their corresponding organic salts. For this purpose, the oil, thus introduced into tower 38, is intimately mixed with alkali, in a suitable amount, introduced into tower 38 at an upper point through line 39. In order to facilitate separation of excess alkali and the various reaction products from the oil, the mixture of oil and alkali is contacted with water introduced into treater 38 at an upper point above the introduction of the alkali, through line 40. The amount of water is limited to the minimum necessary to effect suitable separation of the alkali from oil and other reaction products. In order to facilitate separation of organic salts present in the oil, which were obtained in the above-mentioned conversion from their corresponding acids, a light hydrocarbon stream, such as n-pentane used as a treating agent, is introduced at a point near the bottom of tower 38 through line 41. The admixture of the introduced hydrocarbon stream with salts of organic acids present in the oil, tends to confine these salts in the lower aqueous alcohol layer which is present in treater 38. The introduction of the aforementioned light hydrocarbon stream through line 41, has the additional advantage of permitting the use of strong caustic solutions in the process described above, without increasing the quantity of water required for separating the oil from alkali and other reaction products in tower 38. Hence, as a result of treatment of the oil introduced into treater 38 through line 36, in the process described above, there are present in tower 38 an upper hydrocarbon or oil layer which is withdrawn overhead through line 42 and a lower aqueous alcohol layer containing salts of organic acids, which is withdrawn as bottoms through line 43 for further use or treatment in the process hereinafter described.

The upper hydrocarbon or oil layer from treater 38, containing hydrocarbons, alcohols, aldehydes and ketones is transferred through line 42 to a distillation tower 44. Tower 44 is provided and suitably equipped to separate the oil into relatively low and high boiling hydrocarbon fractions. This tower is operated under conditions effective to separate the oil into an upper fraction, containing vaporized light hydrocarbons, and a lower fraction, comprising alcohols, aldehydes and ketones. The vaporized light hydrocarbons in tower 44 are withdrawn through line 41, cooled to liquefy components present, and transferred to treater 38 for use as a treating agent in the process hereinbefore described. Make-up treating agent is introduced into tower 38 through line 45 with which line 41 connects. The lower fraction from tower 44, comprising alcohols, aldehydes and ketones, is withdrawn through line 46 and may be transferred through line 47, with which line 46 connects, for further treatment outside the scope of the present process, to obtain separation of individual components. It is also possible to pass the overhead oil layer which is withdrawn from treater 38 through line 42, directly to the aforementioned aldehyde-ketone recovery system through line 47 with which line 42 connects (bypassing tower 44), in order to obtain separation of individual aldehyde and ketone components.

It will be noted from the foregoing description that there has been indicated the use of methanol as a treating agent, intended to absorb therein such oxygenated compounds that may be contained in the oil stream entering tower 25 through line 24. There also has been indicated the necessity for proper aqueous dilution of the anhydrous alcohol, which exhibits high solubilities for hydrocarbons as well as for oxygenated compounds, so that improvement in selectivity of extraction may be attained, in that absorption of hydrocarbons in the alcohol is substantially prevented. Accordingly, it has been found that the use of methanol and water, in approximate proportions of 90% methanol and 10% water, is highly satisfactory when employed in the extraction of oxygenated compounds contained in the aforementioned oil stream entering tower 25 through line 24. As alcohol concentrations are increased, the quantities of hydrocarbons present in the extract are proportionately increased, by reason of the reduced selectivity of the alcohol. An increase in the quantities of wash-oil used to remove these hydrocarbons from the extract, may therefore be necessary. On the other hand, as the alcohol concentrations are decreased, quantities of wash-oil required to remove hydrocarbons present in the extract, are also proportionately reduced by reason of increased selectivity in the alcohol. However, excessive dilution may result in incomplete extraction of oxygenated compounds and will, therefore, necessitate an increase in the quantities of aqueous alcohol in circulation. It will, therefore, be noted that optimum benefits will lie in the combined use of a wash-oil and an aqueous alcohol of such concentration which, from an economical standpoint, will render the most substantial selectivity of the alcohol in effecting total extraction of oxygenated compounds from hydrocarbons. It will, therefore, be apparent that the principal operating variables in tower 25 are the rate of alcohol circulation, alcohol concentration and rate of wash-oil circulation. In effecting a given extraction, one or more of these variables may be changed, if a compensatory change is made in one or more of the other variables. The most economical combination will be chosen for any given case. It should be noted, however, that the combination chosen may obviously be different as between different feed-stocks.

While it is preferred to use methanol as an over-all generally suitable treating agent in the process described, other light alcohols such as ethanol or propanol may also be successfully employed. Ethanol and propanol are less selective as solvents than methanol. However, their use in combination with increased quantities of water to improve their selectivity, may be desirable, in that the size of tower 25 may be decreased, effecting proportionate savings in the cost of equipment. In addition, it should be noted that it is possible to use a mixture of light alcohols as a treating agent in the process described, as well as individual light alcohol treating agents. In addition, other types of alcohols, such as glycols, may be successfully used as treating agents. Furthermore, other types of oxygenated organic compounds or mixtures of such compounds substantially more volatile than the bulk of oxygenated compounds being recovered, may be used as treating agents. For example, such oxygenated organic compounds as ketones may be used, e. g., acetone or methyl ethyl ketone; aldehydes e. g., acetaldehyde; and esters e. g., ethyl acetate or methyl acetate. In addition, these compounds may be employed individually or in combination with the aforementioned alcohols as treating agents. In general, the selection of a suitable treating agent will depend upon the use of such oxygenated compounds as can easily be separated from extracted chemicals.

It has been indicated that the selection of a suitable wash-oil, in the process described above, is determined by using oil of such composition that there are no components present in substantial amounts, that are heavier than the highest boiling hydrocarbon which forms an azeotrope with the treating agent. N-pentane has been found to be generally satisfactory as a wash-oil. However, it should be noted that other hydrocarbons having not more than eight carbon atoms per molecule, such as butane, hexane, heptane or octane, individually or in mixtures thereof, may be successfully employed. It is also possible to employ other classes of hydrocarbons which form an azeotrope with the solvent treating agent such as certain olefins. In this respect, it should also be noted that the aforementioned light hydrocarbon stream withdrawn from tower 44 through line 41 for use as a wash-oil in treater 38, need not be a closely fractionated product but may contain any hydrocarbon, or combination of hydrocarbons, that meets the above-mentioned requirements.

It will be noted that the above-mentioned extraction step has particular merit in the use of an alcohol as a treating agent in combination with a wash-oil as a single extraction step. The resultant saving in cost of equipment will be apparent from the fact that when the hydrocarbon extract used as a wash-oil is mixed in one tower with the aforementioned oil stream used as a feed, an increase in the number of extraction towers is obviated.

As described above, the aqueous phase withdrawn as bottoms from separator 14, contains low molecular weight oxygenated compounds, comprising chiefly, light alcohols and light acids. In addition, relatively small quantities of aldehydes, ketones, esters and heavier acids are also present. This aqueous phase from separator 14, is next transferred through line 16 to a distillation tower 48 which functions as an alcohol stripper. In tower 48, the mixture of oxygenated compounds is heated under proper operating conditions of temperature and pressure effective to distill overhead alcohols, aldehydes, ketones, and esters which are withdrawn through line 49. Bottoms obtained from tower 48, comprising aqueous light organic acids, are withdrawn through line 50 for further treatment in the process hereinafter described.

The overhead from tower 48, comprising a mixture of light alcohols, aldehydes, ketones and esters is transferred through line 49 to a distillation tower 51. In tower 51 the mixture is heated under proper operating conditions of temperature and pressure to distill overhead the lowest boiling components of the mixture, which are acetaldehyde and propionaldehyde and which are withdrawn through line 52 for further use outside the scope of this process. Bottoms obtained from tower 51, comprising a distillate of substantially light alcohols and ketones, are withdrawn through line 53. This distillate may contain light alcohols having up to six carbon atoms per molecule, aldehydes other than acetylaldehyde and propionaldehyde, and contains in addition, ketones, esters, traces of organic acids and water. This distillate is next treated with alkali in order to effect neutralization of traces of organic acids present, and such alkali may also be introduced in increased quantities under suitable conditions of temperature effective to saponify esters or polymerize aldehydes. For this purpose, the distillate is transferred from tower 51 through line 53 to a caustic treater 54, in which it is intimately mixed with alkali in a suitable amount introduced through line 55. After the components of the mixture are maintained in intimate contact for a time sufficient to effect the desired neutralization of traces of organic acids present in the distillate from tower 51, and to effect polymerization of aldehydes and saponification of esters, the mixture is withdrawn from caustic treater 54 through line 56. At this point, where so desired, it is possible to transfer the lower aqueous layer obtained from settler 35 (through line 37) and containing salts of heavy organic acids, directly into caustic treater 54, through line 57 with which line 37 connects, for treatment in the process described above. In addition, it is also possible to transfer the aforementioned lower aqueous layer obtained from settler 35, via line 57, directly through line 16 (through line 58, with which line 16 connects) for subsequent treatment in tower 48 in the process described above.

The mixture from caustic treater 54, comprising an aqueous mixture of salts of heavy organic acids, aldehyde polymers, light alcohols having up to six carbon atoms per molecule, ketones, relatively small quantites of hydrocarbons and excess alkali, is withdrawn through line 56. The hydrocarbons present in the above mixture must be removed in order to effect the subsequent recovery of pure alcohols. It has been found that the hydrocarbons tend to concentrate as their homogeneous alcohol azeotropes in the distillation cuts taken between the various alcohols. In such aqueous alcohol solutions, contaminating hydrocarbons can be removed efficiently and economically by means of one or more hydrocarbons which are themselves readily removable. In principle the process may be considered as one of dilution rather than extraction in that the undesirable hydrocarbons are replaced by one or more of the aforementioned hydrocarbons that may be readily eliminated.

Such a hydrocarbon may be n-pentane which is highly suitable in over-all use as applied to the aforementioned process and as evidenced by experimental laboratory data. It should be noted that the operation is not restricted to the sole use of pentane for the purpose indicated, but that other lighter or heavier hydrocarbons may also be successfully employed such as butane or heptane. Butane has the advantage of not being known to form an azeotrope with methanol, although it has a higher solubility in aqueous alcohol solutions. On the other hand, it may be desirable to use heavier hydrocarbons as a solvent such as hexane, the latter being less soluble than pentane but requiring the stripping of lighter hydrocarbons out of the hexane as well as the stripping of hexane from the heavier hydrocarbons. The choice of a suitable hydrocarbon will be influenced by its solubility, and by its boiling point or the boiling points of its azeotropes with light alcohols.

To effect the removal of such contaminating hydrocarbons, the mixture from caustic treater 54 is transferred through line 56 to an extraction tower 59. In tower 59 the mixture introduced through line 56, is subjected to intimate countercurrent contact with pentane or other selected suitable hydrocarbon treating agent, which is introduced into tower 59 at a low point through line 60. The treating agent and the aforementioned alcohol mixture, containing hydrocarbons, are contacted in tower 59 under conditions effective to absorb in the treating agent, the hydrocarbons present. In order to reduce the solubility of the treating agent in the resulting alcohol phase produced in tower 59, as well as to reduce the pentane requirements for effecting total extraction of contaminating hydrocarbons, water may be introduced into tower 59 at an upper point through line 61. The bottoms thus produced in tower 59, comprising an aqueous mixture of alcohols having up to six carbon atoms per molecule, salts of heavy organic acids, ketones, excess alkali and a portion of the pentane treating agent, is withdrawn as bottoms through line 62 for further treatment in the process hereinafter described. The overhead from tower 59, comprising the bulk of the pentane treating agent, higher hydrocarbons and substantially all of the aldehyde polymers, together with small quantities of alcohols, is transferred through line 28 for use as a wash-oil in tower 25, in the process hereinbefore described. Make-up quantities of wash-oil for use in tower 25 are introduced through line 63.

The bottoms from tower 59 is transferred through line 62 to a distillation tower 64, to effect the removal of the pentane treating agent from the alcohol stream. In tower 64 the mixture is heated under proper conditions of temperature and pressure, to distill overhead pentane-methanol azeotropes which are withdrawn through line 65. The pentane-free raffinate is withdrawn as bottoms through line 66 for further treatment in the process hereinafter described.

The overhead distillate from tower 64 comprising pentane-methanol azeotropes is cooled and transferred through line 65 to a separator 67. In order to effect phase separation, water is introduced into separator 67 through line 65a. In separator 67, by means of settling action, an upper phase comprising pentane is withdrawn through line 60 and is thus transferred to tower 59 for further use of the pentane as a treating agent. Make-up pentane is introduced into line 60 through line 68 with which line 60 connects.

Bottoms from separator 67, comprising an aqueous alcohol stream containing small quantities of pentane, are transferred through line 69 to combine with the extract from tower 59. The combined mixture is transferred through line 62 into tower 64 for further treatment in the process hereinbefore described. It should be noted that where so desired, it is possible to transfer the overheads withdrawn from tower 32 through line 26 (and which comprise, essentially, methanol and hydrocarbons, as previously described) to combine with bottoms from tower 59 and separator 67 and entering tower 64 through line 62. Conveniently, this is accomplished by passing the overheads from tower 32 into line 62 through line 70, with which line 62 connects.

The pentane-free raffinate, obtained as bottoms from tower 64 in the process described above and comprising a mixture of aqueous alcohols having up to six carbon atoms per molecule, salts of heavy organic acids, ketones and excess alkali is transferred through line 66 to a distillation tower 71, which functions as an alcohol stripper. In tower 71 the mixture is heated to distill overhead a mixture of alcohols and ketones which is withdrawn through line 72. Bottoms from tower 71, comprising an aqueous mixture of salts of heavy organic acids and excess alkali, are transferred through line 73 for further treatment in the process hereinafter described. It should be noted that it is also possible at this point, to transfer the combined bottoms from settler 35 and caustic treater 38 (comprising salts of heavy organic acids, alcohols and water) directly into line 66 for treatment in tower 71, as described above. Conveniently, this is accomplished by transferring the bottoms thus combined, through line 74 into line 66 with which line 74 connects. Alternatively, it is possible to transfer the aforementioned stream in line 74, directly into line 57 for treatment in caustic treater 54 in the process hereinbefore described. This may be accomplished by transferring the stream in line 74 through line 75 into line 57, with which line 75 connects. Furthermore, where so desired, the treated mixture from caustic treater 54, which is withdrawn through line 56, as hereinbefore described, may be transferred directly into line 66 for treatment in tower 71, by-passing towers 59, 64 and separator 66, for removal of hydrocarbon impurities, in the manner described above. This may be accomplished by transferring the stream in line 56 through line 76 into line 66, with which line 76 connects.

The overheads from tower 71, comprising an aqueous mixture of alcohols and ketones, are transferred through line 72 to a distillation tower 77. In tower 77 the mixture is heated to distill overhead a mixture of the lowest boiling alcohol-ketone components, namely, methanol, acetone and methyl ethyl ketone, which are withdrawn through line 78. Bottoms from tower 77, comprising $C_2$ and higher alcohols, are withdrawn through line 79 for further treatment in the process hereinafter described. The overheads from tower 77, comprising a mixture of methanol, acetone, and methyl ethyl ketone are transferred through line 78 to a distillation tower 80. In tower 80 the mixture is heated, under proper operating conditions of temperature and increased pressure, to distill overhead the lowest boiling components of the mixture, namely, acetone and methanol, which are withdrawn through line 81. Bottoms from tower 80, comprising methyl ethyl ketone, are recovered through line 82.

The acetone-methanol overhead from tower 80 is transferred through line 81 to a distillation tower 83. In tower 83 the mixture is heated, under proper operating conditions of temperature and increased pressure, to distill overhead acetone-methanol azeotropes, which are withdrawn through line 84. Bottoms from tower 83, comprising methanol-free acetone, are recovered through line 85. The acetone-methanol azeotropes from tower 83 are transferred through line 84 to a distillation tower 86. In tower 86 the mixture is heated, under proper operating conditions of temperature and atmospheric pressure, to distill overhead acetone-methanol azeotropes which are withdrawn through line 87. The mixture thus obtained is recycled through line 87 into line 78 for use in tower 80, as described above. Bottoms from tower 86, comprising methanol in a substantially pure state, are recovered through line 88.

Bottoms from tower 77, comprising aqueous $C_2$ and higher alcohols, are transferred through line 79 to a hydrogenation reactor 89. Reactor 89 is provided for effecting catalytic hydrogenation, by conventional methods, of aldehydes and ketones that may be present in the alcohol stream obtained as bottoms from tower 77. Hydrogen thus employed, is introduced into reactor 89 through line 90. As a result of the conversion of aldehydes and ketones into alcohols by hydrogenation in reactor 89, the product of the reaction is withdrawn as bottoms through line 91. Bottoms thus obtained are cooled and transferred through line 91 to a separator 92. In separator 92, separation is obtained between alcohols, which are withdrawn as bottoms through line 93, and hydrogen, which is recycled through line 94 through line 90, with which line 94 connects. At this point, it should be noted that it is also possible to transfer aldehydes and ketones present in line 47 (obtained in the process hereinbefore described) directly into line 79 via line 94, for conversion into alcohols by catalytic hydrogenation in reactor 89 as described above.

The aqueous mixture of $C_2$ and higher alcohols obtained as bottoms from separator 92, is transferred through line 93 to a fractionation tower 96. Tower 96 is operated under proper conditions of temperature and pressure effective to distill overhead aqueous ethanol which is recovered through line 97. Bottoms from tower 96, comprising an aqueous mixture of $C_3$ and higher alcohols, are withdrawn through line 98.

It is possible at this point to dehydrate the alcohol stream in line 98, through the propanol-water azeotrope. Accordingly, the alcohol stream in line 98 is transferred to a fractionation tower 99. Tower 99 is heated to distill overhead a propanol-water azeotrope, which is withdrawn through line 100 and transferred to a distillation tower 101. Tower 101 is provided to effect the dehydration of propanol. A dehydrating agent such as benzene, or toluene, is therefore introduced into tower 101 through line 102, with which line 100 connects. Tower 101 is next heated under conditions effective to obtain water-free propanol as bottoms, which are withdrawn through line 103 for further use outside the scope of this process. A portion of the water-free propanol, thus obtained, may be transferred from line 103, via line 104, into line 98 for reuse of propanol in effecting subsequent dehydration of additional quantities of alcohols entering tower 99 in the process described above.

Overheads from tower 101 comprise water-containing propanol and hydrocarbons. These overheads are withdrawn through line 105, cooled and transferred to a separator 106. In separator 106, the aqueous propanol hydrocarbon mixture is separated into an upper phase, comprising a propanol-hydrocarbon-water layer, rich in hydrocarbons, which is withdrawn through line 107, and a lower phase, comprising a propanol-hydrocarbon-water layer, rich in water, which is withdrawn through line 108. The upper phase from separator 106 is transferred through line 107 into line 100, with which line 107 connects, for reuse of propanol in the process described above. The lower phase from separator 106 is transferred through line 108 to a distillation tower 109, which functions as a propanol stripper. Tower 109 is heated to distill overhead, a water-free propanol-hydrocarbon mixture, which is withdrawn through line 110. Bottoms from tower 109, comprising excess water, are withdrawn through line 111. The overhead from tower 109, comprising a water-free hydrocarbon mixture, is transferred through line 110 into line 107 to combine with the upper phase from separator 106 in line 107. The combined propanol-hydrocarbon-water stream is then returned to tower 101 through line 107 for further use in the process described above. Bottoms from tower 99, comprising $C_4$ and higher alcohols, are withdrawn through line 112. These alcohols may be next transferred through line 112 to any conventional alcohol fractionation system, in which individual $C_4$ and higher alcohols may be recovered, for further use or treatment outside the scope of the present process.

As hereinbefore described, there are present in lines 47 and 95 a mixture of aldehydes and ketones. It is, therefore, possible at this point to transfer these combined aldehyde-ketone mixtures, via line 113, to a hydrogenation reactor 114. Reactor 114 is provided for effecting catalytic hydrogenation, by conventional methods, of aldehydes and ketones present in line 113. Hydrogen thus employed, is introduced into tower 114 through line 115. As a result of the conversion of aldehydes and ketones into alcohols by hydrogenation in reactor 114, the product of the reaction is withdrawn as bottoms through line 116. Bottoms thus obtained, are cooled and transferred through line 116 to a separator 117. In separator 117, separation is obtained between $C_3$ and higher alcohols which are withdrawn as bottoms through line 118, and hydrogen, which is recycled through line 119 into line 115 with which line 119 connects. At this point, it is also possible to transfer the upper oil layer from settler 35, in line 36, directly into line 113, via line 120, with which line 113 connects. In line 120 there is present a mixture of oxygenated compounds, comprising heavy alcohols, aldehydes, ketones, traces of organic acids, esters, and water. Accordingly, this mixture may be transferred through line 113 into reactor 114, in order to convert aldehydes, ketones, esters and acids into alcohols by catalytic hydrogenation in the process described above. Bottoms withdrawn from separator 117, comprising aqueous $C_3$ and higher alcohols, may be transferred, through line 118, into line 98 to combine with the alcohol stream obtained as bottoms from tower 96. The combined stream may then be subjected to further fractionation and treatment in the process hereinbefore described.

The combined aqueous alcohol stream in line 98, comprising $C_3$ and higher alcohols, may be subjected at this point to an alternative dehydration step. Accordingly, this stream in line 98 is transferred through line 121, with which line 98 connects, to a distillation tower 122. An entrainer, such as ethylene dichloride or acetone, is introduced into tower 122 through line 123. Tower 122 is heated under conditions effective to absorb in the entrainer, water that is present in the alcohol stream entering tower 122 through line 121. Following treatment in tower 122, an overhead comprising a mixture of the entraining agent and water, is withdrawn through line 124. Bottoms from tower 122, comprising dehydrated $C_3$ and higher alcohols, are withdrawn through line 125. The alcohol stream in line 125 is next transferred to a fractionation tower 126. Tower 126 is operated under proper conditions of temperature and pressure effective to distill overhead anhydrous $C_3$ alcohols which are recovered through line 127. Bottoms from tower 126, comprising anhydrous $C_4$ and higher alcohols are withdrawn through line 128. The alcohol stream in line 128 may be next transferred into line 112, in which it is combined with $C_4$ and higher alcohols, and transferred to any conventional alcohol fractionation system, in which individual $C_4$ and higher alcohols may be recovered for further use or treatment outside the scope of the present process.

Overheads from tower 122, comprising a mixture of the entraining agent and water, are cooled and transferred through line 124 to a separator 129. In separator 129 there are present an upper layer, comprising the entraining agent which is withdrawn through line 123, and a lower aqueous layer containing proportionately smaller quantities of the entraining agent, which are withdrawn through line 130. The upper layer from separator 129, comprising the entraining agent, is recycled through line 123 to tower 122 for reuse. Make-up quantities of entraining agent are introduced into line 123 through line 131, with which line 123 connects.

The lower aqueous layer from separator 129, containing proportionately small quantities of entraining agent, is transferred through line 130 to a distillation tower 132. Tower 132 is operated under conditions of temperature and pressure effective to distill overhead the entraining agent and small quantities of water, which are withdrawn through line 133. Water obtained as bottoms from tower 132 is withdrawn through line 134. The overhead from tower 132, comprising the entraining agent and small quantities of water, may be transferred through line 133 into line 124, with which line 133 connects, for separation of entraining agent and water in separator 129, in the process described above.

As a result of the process, hereinbefore described, bottoms from tower 71 withdrawn through line 73, comprise an aqueous mixture of salts of organic acids and excess alkali. In accordance with the process of the invention, the mixture is subjected to further treatment in order to release organic acids present in the mixture from their salts. The aqueous mixture of organic acids and excess alkali is, therefore, transferred through line 73 to a mixer 135. A high boiling inorganic acid having a boiling point higher than that of water, such as sulfuric acid, or an inorganic acid which forms a maximum boiling azeotrope with water, such as hydrochloric acid, is introduced through line 136 and combined with the aqueous mixture of organic acids and excess alkali in line 73 which enters mixer 135. Mixer 135 is provided to intimately mix the aqueous alkali mixture of salts of organic acids with the introduced inorganic acid, in order to effect neutralization of these salts. The resulting mixture from mixer 135, comprises free organic acids and salts of the introduced inorganic acid which are withdrawn through line 137. The aqueous mixture of free organic acids and inorganic salts is transferred through line 137 to a separator 138. In separator 138 the heavier organic acids will separate from the water solution by reason of their insolubility and will contain a portion of the lighter water-soluble organic acids by reason of the solvent action of the heavier acids on the lighter acids. These acids, comprising an upper acid-rich phase in separator 138, are withdrawn through line 139. The lower water-rich phase in separator 138, comprising inorganic salts, the introduced inorganic acid and some of the lighter organic acids, are withdrawn as bottoms through line 140 and transferred to a distillation tower 141 which functions as an acid stripper. Tower 141 is heated under conditions effective to distill overhead, organic acids as their water azeotropes, having three or more carbon atoms per molecule. The latter are withdrawn from tower 141 through line 142 and are thus transferred to line 139 to combine with the acids withdrawn as an upper phase from separator 138 through line 139. The combined stream is transferred through line 139 to combine with the aqueous solution of light organic acids obtained as bottoms from tower 48 through line 50, as hereinbefore described. The bottoms from tower 141, comprising inorganic salts, excess quantities of the introduced inorganic acid and excess water, are withdrawn through line 143 for further use outside the scope of this process. If so desired, it is possible to transfer the lower water-rich phase withdrawn from separator 138 through line 140, into line 139 via line 144 (by-passing tower 141), and thus combine this phase with the aqueous stream of light organic acids in line 50, for further use or treatment in the process hereinafter described. It should be noted, that it is also possible to transfer the aqueous stream of light organic acids in line 50 into line 19, via line 145, for use in scrubber 18 in the process hereinbefore described.

In order to obtain recovery of water-free organic acids, the total stream of aqueous organic acids in line 50 is next transferred, in accordance with the process of the invention, to an extraction tower 146. In tower 146 the stream introduced through line 50, is subjected to intimate countercurrent contact with a solvent treating agent, such as ethyl acetate, which is introduced into tower 146 through line 147. The treating agent and the aqueous stream of organic acids, are contacted in tower 146 under conditions effective to absorb in the treating agent a large proportion of the water contained in the aqueous stream of organic acids passing through line 50. The extract thus produced, comprises an acid-rich mixture containing organic acids, excess solvent treating agent, and proportionately small quantities of water, and is withdrawn overhead from tower 146 through line 148. Bottoms from tower 146, comprising a raffinate containing the solvent treating agent and proportionately large quantities of water, are withdrawn from tower 146 through line 149.

The extract from tower 146 comprising an acid-rich mixture containing organic acids, excess solvent treating agent and proportionately small quantities of water, is withdrawn overhead through line 148 and is transferred to a distillation tower 150, which functions as a stripper for the solvent treating agent. Tower 150 is heated under conditions effective to distill overhead a mixture of the solvent treating agent and water which is withdrawn through line 151. Bottoms, comprising both anhydrous light and heavy organic acids, solvent-free, are withdrawn from tower 150 through line 152. These bottoms are next transferred through line 152 to a fractionation tower 153. Tower 153 is operated under conditions of temperature and pressure effective to distill overhead substantially anhydrous acetic acid, which is withdrawn through line 154. Bottoms from tower 153, comprising $C_3$ and higher acids may be next transferred, through line 155, to any conventional acid fractionation system in which individual $C_3$ and higher acids may be recovered for further use outside the scope of this process.

As hereinbefore described, the raffinate from tower 146 contains the solvent treating agent and proportionately large quantities of water. This raffinate is then transferred through line 149 to a distillation tower 156. Tower 156 is heated under conditions of temperature and pressure effective to distill overhead, water-azeotropes of the solvent treating agent which are withdrawn through line 157. Bottoms from tower 156, comprising excess water, are withdrawn through line 158. The water-azeotropes of the solvent treating agent, which are withdrawn overhead from tower 156, through line 157, are transferred into line 151, with which line 157 connects. In line 151, the overheads from tower 156 are combined with the overheads from tower 150, which comprises a mixture of the solvent treating agent and water. The combined mixture is then transferred through line 151 to a separator 159. In separator 159 separation is effected between an upper layer, comprising the solvent treating agent, and a lower water layer, which is withdrawn as bottoms through line 160 and which is transferred via line 149, for treatment in tower 156 in the process described above. The upper layer from separator 159, comprising the solvent treating agent, is withdrawn through line 147 for further use in tower 146 as described above. Make-up solvent is introduced through line 161.

It should be noted, that while I prefer to use ethyl acetate as a solvent in the aforementioned acid extraction step, the invention is not limited solely to its use; other solvents may be advantageously employed, such as ethyl ether, isopropyl ether, isopropyl chloride and the like. Ethyl ether may have particular desirability in instances where cross-esterification and hydrolysis are encountered, when ethyl acetate is used as a solvent. Where such is the case and ethyl ether is used as a solvent, an appreciably larger volume of solvent would be required. In order to obtain an anhydrous stream where ethyl ether is used, the ether-water azeotrope can best be removed at a pressure of approximately 100 pounds per square inch absolute. In addition to using solvents, lower boiling than the acids to be extracted, it is also possible to use high boiling alcohols, ketones and organic acids in the process described above.

It should be noted, that where so desired, it is possible to transfer the upper acid-rich phase in separator 138, directly into tower 150 which functions as a solvent stripper in the process described above. Conveniently, this may be accomplished by transferring the aforementioned upper phase from separator 138 through line 165, via line 148, for treatment in tower 150. Such procedure may have a particular advantage, in that the upper acid-rich phase from separator 138, comprising proportionately larger quantities of the heavier organic acids than lighter organic acids, may be transferred directly into tower 150, by-passing the aforementioned solvent extraction step in tower 146, the separation step in separator 159 and the distillation step in tower 156. This procedure is made possible by reason of the heavier organic acids separating from the water solution in separator 138 because of their insolubility, and containing portions of the lighter water-soluble organic acids by reason of the solvent action of the heavier acids on the lighter acids.

As an alternative method for recovering water-free organic acids from the total stream of aqueous organic acids in line 50, it is possible to recover such water-free acids by means of the solvent action of the heavier acids on the lighter acids. Accordingly, the total stream of aqueous organic acids in line 50 may be transferred, via line 162, to an extraction tower 163. In tower 163 the stream introduced through line 162, is subjected to intimate countercurrent contact with one or more heavier organic acids, comprising $C_7$ or higher organic acids, which are introduced into tower 163 through line 164 as a solvent treating agent. This treating agent, conveniently, may be one or more of the $C_7$ or higher organic acids which have been recovered from the acid fractionation system, into which the stream of organic acids in line 155 has been introduced, in the process hereinbefore described.

The solvent treating agent in line 164 and the total stream of aqueous organic acids in line 162 are contacted in tower 163 under conditions effective to absorb in the treating agent, the lighter water-soluble acids by reason of the solvent action of the heavier acids (solvent treating agent) on the lighter acids. Following treatment in tower 163, overheads are obtained comprising a mixture of light and heavy organic acids and small quantities of water. These overheads are withdrawn through line 166. Bottoms from tower 163, comprising excess water, are withdrawn through line 167.

The overheads from tower 163, comprising a mixture of light and heavy organic acids and small quantities of water, are transferred through line 166 to a distillation tower 168. Tower 168 is provided to effect dehydration of acids introduced through line 166. An entrainer, such as ethyl acetate, butyl acetate, ethyl ether, isopropyl ether, isopropyl chloride or the like, is introduced into tower 168 through line 169. Tower 168 is next heated under conditions effective to absorb in the entraining agent, water that is present in the organic acid stream entering tower 168 through line 166. The entraining agent thus used, serves to dehydrate not only the aqueous light organic acids introduced into tower 163 through line 162, but also effects dehydration of any quantities of water that may be present in the heavier organic acids introduced into tower 163 through line 164 as the solvent treating agent.

Following treatment in tower 168, an overhead comprising a mixture of the entraining agent and water is withdrawn through line 170. Bottoms from tower 168, comprising dehydrated light and heavy organic acids, are withdrawn through line 171. The dehydrated acids in line 171 may next be transferred into line 155, with which line 171 connects, from which they may be further transferred to any conventional acid fractionation system, in which individual $C_3$ and higher acids are recovered for further use, as hereinbefore described.

The overheads from tower 168, comprising a mixture of the entraining agent and water, are cooled and transferred through line 170 to a separator 172. In separator 172 there are present an upper layer, comprising the entraining agent which is withdrawn through line 169, and a lower aqueous layer containing proportionately smaller quantities of the entraining agent, which is withdrawn through line 173. The upper layer from separator 172, comprising the entraining agent, is recycled through line 169 to tower 168 for reuse. Make-up quantities of entraining agent are introduced into line 169, through line 174 with which line 169 connects.

The lower aqueous layer from separator 172, containing proportionately small quantities of entraining agent, is transferred through line 173 to a distillation tower 175. Tower 175 is operated under conditions of temperature and pressure effective to distill overhead the entraining agent and small quantities of water, which are withdrawn through line 176. Water obtained as bottoms from tower 175, is withdrawn through line 177. The overhead from tower 175, comprising the entraining agent and small quantities of water, may be transferred through line 176 into line 170, with which line 176 connects, for separation of entraining agent and water in separator 172, in the process described above.

To recapitulate, this invention is directed to a process for the separation of oxygenated organic compounds present in the reactor gas obtained in the catalytic hydrogenation of oxides of carbon, where such compounds may comprise, essentially, light and heavy alcohols and organic acids, esters, aldehydes, ketones and hydrocarbons. However, while the invention has a particular applicability to the separation of such compounds from the source indicated, the process of the invention is not necessarily restricted to effecting the desired separation of these compounds as derived from the aforementioned source. The process of the invention may be also successfully applied to the separation of any mixtures of the aforementioned compounds, without regard to the source from which these mixtures may have been derived, and without regard to the composition of such mixtures.

In addition, while a particular embodiment of the invention has been described, for purposes of illustration, it should be understood that various modifications and adaptations thereof, which will be obvious to one skilled in the art, may be made within the spirit of the invention as set forth in the appended claims.

I claim:

1. A process for recovering the products of hydrogenation of oxides of carbon wherein said products comprise hydrocarbons, organic acids and non-acid oxygenated organic compounds which comprises cooling said products to effect substantial condensation of normally liquid components to form an oil product liquid phase containing at least a portion of said oxygenated organic compounds and a water product liquid phase, separating said phases, subjecting said oil product liquid phase to extraction treatment with an aqueous solution of a solvent comprising a light alcohol to obtain a raffinate containing hydrocarbons and an extract containing oxygenated organic compounds, subjecting the extract thus obtained to distillation to obtain a relatively low boiling fraction comprising solvent and a relatively high boiling fraction comprising oxygenated organic compounds, separating oxygenated organic compounds from said relatively high boiling fraction, combining oxygenated organic compounds separated from said relatively high boiling fraction with said water product liquid phase, and subjecting the resulting mixture to distillation to obtain a relatively low boiling fraction comprising non-acid oxygenated organic compounds and a relatively high boiling fraction comprising organic acids.

2. The process of claim 1 in which the solvent is methanol.

3. The process of claim 1 in which the solvent is ethanol.

4. A process for recovering the products of hydrogenation of oxides of carbon wherein said products comprise hydrocarbons, organic acids and non-acid oxygenated organic compounds which comprises cooling said products to effect substantial condensation of normally liquid components to form an oil product liquid phase containing at least a portion of said oxygenated organic compounds and a water product liquid phase, separating said phases, subjecting said oil product liquid phase to extraction treatment with an aqueous solution of a solvent comprising a light alcohol to obtain a raffinate containing hydrocarbons and an extract containing oxygenated organic compounds, contacting said extract with a liquid hydrocarbon wash-oil which is readily separable from said oxygenated compounds by distillation, subjecting the extract thus treated to distillation to obtain a relatively low boiling fraction comprising a solvent and a relatively high boiling fraction comprising oxygenated organic compounds, separating oxygenated organic compounds from said relatively high boiling fraction, combining oxygenated organic compounds separated from said relatively high boiling fraction with said water product liquid phase, and subjecting the resulting mixture to distillation to obtain a relatively low boiling fraction comprising non-acid oxygenated organic compounds and a relatively high boiling fraction comprising organic acids.

5. The process of claim 4 in which said wash-oil is a hydrocarbon whose boiling point is substantially within the boiling range of said oxygenated organic compounds.

6. The process of claim 4 in which said wash-oil is a hydrocarbon whose boiling point is substantially below the boiling range of said oxygenated organic compounds.

7. The process of claim 4 in which said wash-oil is a hydrocarbon having from 5 to 8 carbon atoms per molecule.

8. A process for recovering the products of hydrogenation of oxides of carbon wherein said products comprise hydrocarbons, organic acids and non-acid oxygenated organic compounds which comprises cooling said products to effect substantial condensation of normally liquid components to form an oil product liquid phase containing at least a portion of said oxygenated organic compounds and a water product liquid phase, separating said phases, subjecting said oil product liquid phase to extraction treatment with an aqueous solution of a solvent comprising methanol to obtain a raffinate containing hydrocarbons and an extract containing oxygenated organic compounds, contacting said extract with pentane, subjecting the extract thus treated to distillation to obtain a relatively low boiling fraction comprising solvent and a relatively high boiling fraction comprising oxygenated organic compounds, separating oxygenated organic compounds from said relatively high boiling fraction, combining oxygenated organic compounds separated from said relatively high boiling fraction with said water product liquid phase, and subjecting the resulting mixture to distillation to obtain a relatively low boiling fraction comprising non-acid oxygenated organic compounds and a relatively high boiling fraction comprising organic acids.

HENRY G. McGRATH.

REFERENCES CITED

The following references are of record in the file of this patent:

UNITED STATES PATENTS

| Number | Name | Date |
|---|---|---|
| 1,870,816 | Lewis | Aug. 9, 1932 |
| 1,979,841 | Pier et al. | Nov. 6, 1934 |
| 2,076,607 | Woodhouse | Apr. 13, 1937 |
| 2,083,125 | Scheuble | June 8, 1937 |
| 2,099,475 | Giesen et al. | Nov. 16, 1937 |
| 2,116,081 | Pier et al. | May 3, 1938 |
| 2,171,324 | Zetzsche et al. | Aug. 29, 1939 |
| 2,274,750 | Soenksen et al. | May 3, 1942 |
| 2,286,814 | Kemp | June 16, 1942 |
| 2,457,257 | Michael et al. | Dec. 28, 1948 |
| 2,470,782 | McGrath et al. | May 24, 1949 |
| 2,516,940 | Arnold et al. | Aug. 1, 1950 |
| 2,533,675 | Marschner | Dec. 12, 1950 |

FOREIGN PATENTS

| Number | Country | Date |
|---|---|---|
| 446,305 | Great Britain | Apr. 28, 1936 |

OTHER REFERENCES

Koch et al.: Brennstoff Chem. 16, pp. 382–87 (1935) (Photo 260–450).